March 5, 1957 M. BITZER 2,784,031
WINDSHIELD WASHER SYSTEM
Filed Oct. 19, 1953
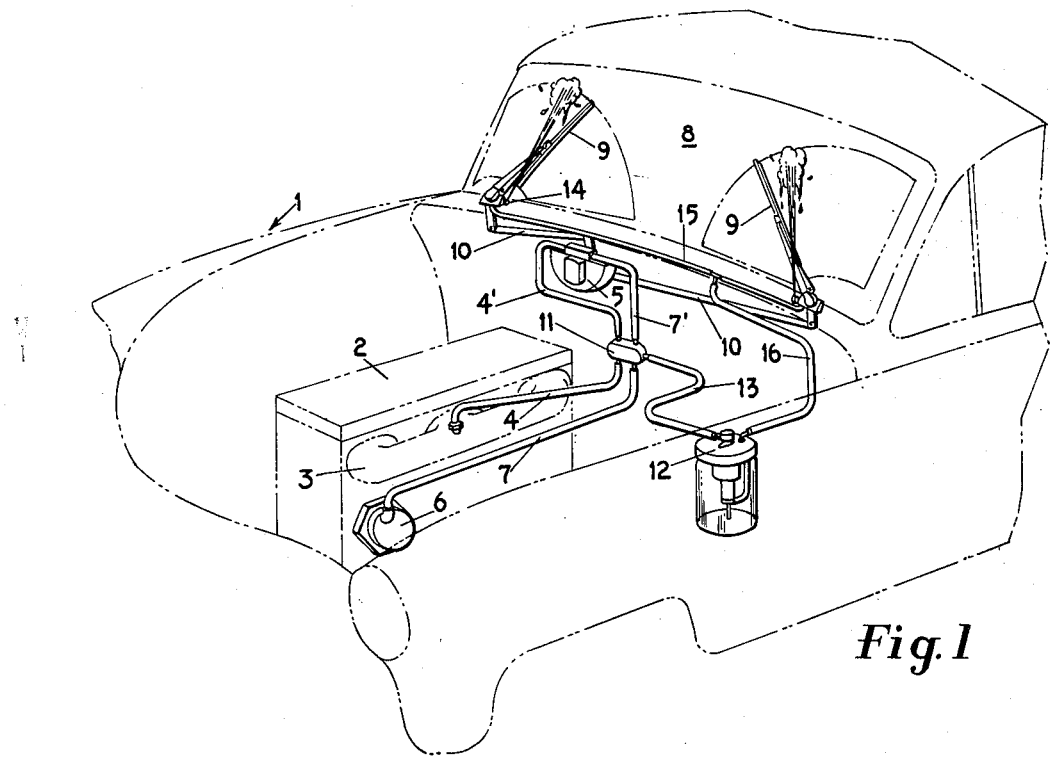
Fig.1
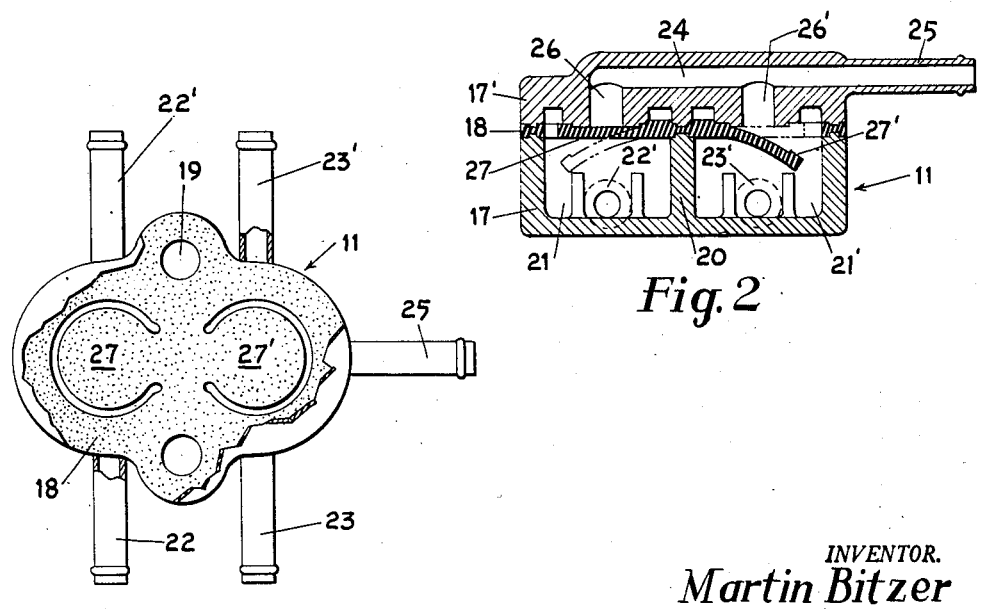
Fig.2
Fig.3
INVENTOR.
Martin Bitzer
BY
Beau, Brooks, Buckley & Beau,
ATTORNEYS.

United States Patent Office 2,784,031
Patented Mar. 5, 1957

2,784,031
WINDSHIELD WASHER SYSTEM

Martin Bitzer, Kenmore, N. Y., assignor to Trico Products Corporation, Buffalo, N. Y.

Application October 19, 1953, Serial No. 386,816

5 Claims. (Cl. 299—58)

This invention relates to an accessory system for automotive vehicles, and more particularly to a windshield clearing system therefor.

The employment of the suction influence of the intake manifold of the vehicle's engine to power automotive accessories is almost universal. However, such suction influence has a fluctuating characteristic and during periods of acceleration the magnitude of the vacuum existent in the manifold is insufficient for the proper operation of the various accessories. This shortcoming of the manifold vacuum is especially noticeable in the windshield clearing system wherein the washing and wiping components thereof tend to cease operating when the vehicle accelerates.

Accordingly, it is the primary object of this invention to provide a windshield clearing system which will operate efficiently regardless of magnitude of the manifold suction.

It is an additional object of this invention to provide a suction powered windshield clearing system wherein an auxiliary source of vacuum is made available to the system when the suction influence of the manifold is insufficient for the proper operation thereof.

For a better understanding of these and other objects of the invention, reference is made to the following specifications and accompanying drawings wherein:

Fig. 1 is a diagrammatic representation in perspective, of an automotive vehicle equipped with a windshield clearing system constructed in accordance with the instant invention;

Fig. 2 is a cross-sectional view of the valve mechanism which automatically and selectively places the washer in communication with either the manifold or the auxiliary source of vacuum; and Fig. 3 is a front elevational view, partially broken away, of the above mentioned valve mechanism.

Referring now more particularly to the drawings, the numeral 1 generally designates an automotive vehicle having an engine 2 with an intake manifold 3. Conduits 4 and 4' interconnect the manifold with wiper motor 5 which is of the fluid pressure type. Pneumatic pump 6 employed for crankcase ventilation is joined to the wiper motor by conduits 7 and 7'. When the operator of the vehicle desires to clean the windshield 8, he opens the wiper motor valve in a conventional manner so as to place the pressure chamber of the motor in communication with the manifold, permitting the latter to withdraw air from the chamber. The withdrawal of air causes the oscillation of a piston located within the chamber, and this motion is transmitted to the wipers 9 by connecting rods 10. Concurrently, pump 6 draws air from the atmosphere past a filter located in the wiper motor and exhausts the filtered air into the crankcase for ventilating purposes. In the event that the magnitude of the vacuum existent in the manifold drops below the value necessary for proper wiper operation, a system of valves automatically places the pump in communication with the pressure chamber of motor 5, while cutting the manifold off therefrom. For a more detailed description of that part of the windshield clearing system described above, reference may be had to application Serial No. 361,146 filed on June 12, 1953, by John R. Oishei, et al. for a Windshield Cleaner, now Patent No. 2,685,776, issued August 10, 1954.

Valve mechanism 11 is interposed between conduits 4 and 7 and 4' and 7'; and is also connected to the washer pump 12 by conduit 13. The pump, which may be placed at any convenient location within the engine compartment of the vehicle, may be of the conventional fluid pressure type disclosed in application Serial No. 323,902, filed by John R. Oishei on December 3, 1952, for a Windshield Washer, now Patent No. 2,746,652, issued May 22, 1956. Nozzles 14 are connected to pump 12 by conduits 15 and 16 and are located so as to direct jets of water at the windshield when the pump is in operation. When it is desired to wash the windshield, the operator manipulates a control which places the pump in communication with a source of vacuum. A pressure differential is as a result created within the pump and sets the latter in operation. For a more detailed description of the internal construction and operation of the pump, resort may be had to the above identified application.

Referring now more particularly to Figs. 2 and 3, valve mechanism 11 comprises a two part casing 17, 17' having a flexible diaphragm 18 sandwiched therebetween. Perforations 19 are provided for the purpose of fastening the assemblage together through the use of bolts. Wall 20 integral with casing 17 abuts the underside of diaphragm 18, so as to form two isolated pressure chambers 21 and 21' within the casing. Nipples 22 and 22' protrude from opposite sides of pressure chamber 21, and are connected to conduits 4 and 4' respectively so as to provide a path from the manifold 3 to wiper motor 5. Similarly, nipples 23 and 23' protrude from the opposite sides of pressure chamber 21' and are connected to conduits 7 and 7' for the purpose of providing a path from the ventilating pump 6 to motor 5. Passageway 24 terminates in nipple 25 which is connected to washer pump 12 by conduit 13. Pressure chambers 21 and 21' are placed in communication with passageway 24 by transverse bores 26 and 26'. Diaphragm 18 is provided with two opposed horseshoe shaped perforations so as to form flaps or pressure responsive elements 27 and 27', one flap overlying each of the pressure chambers and separating it from its respective bore 26 or 26'.

Under normal operating conditions, manifold 3 will tend to suck air from motor 5 via conduit 4', nipple 22', pressure chamber 21 and conduit 4. This causes a subatmospheric pressure to exist in chamber 21. Since the pressure in passageway 24 is atmospheric, a pressure differential exists across flap 27 forcing it downward so as to uncover bore 26 and provide a path from passageway 24 to the pressure chamber. With bore 26 uncovered, the air in passageway 24 will flow into the chamber and thence to the manifold, causing the pressure in the passageway and therefore in conduit 13 to drop to substantially that existent in the pressure chamber. As the vacuum in chamber 21' created by pump 6 is normally less than that in chamber 21, the differential across flap 27' forces it upward into the position shown in phantom so as to tightly seal bore 26'. As a result, oil will not be sucked out of the crankcase due to the suction influence of the manifold.

In the event that the vehicle is accelerated, the manifold pressure, and therefore that existent in pressure chamber 21 rises toward atmospheric. Concurrently, the pressure at the intake side of pump 6 and therefore that existent in chamber 21' drops due to the increased R. P. M. of the crankshaft. As a result the pressure differentials across flaps 27 and 27' reverse, and the flaps move to the position illustrated in Fig. 2 so as to intercommunicate chamber 21' and passageway 24 while sealing off chamber 21. The vacuum is thus maintained in the passageway due to the action of pump 6. Further, since chamber 21 is sealed, gasoline will not be sucked out of the manifold by the suction influence of the pump.

It may therefore be seen that by employing valve mechanism 11, it is possible to utilize two alternative sources of vacuum for activation of the washer pump, without having either source interfere with the efficient operation of the other. The valve automatically and selectively intercommunicates the washer pump with the highest available source of vacuum so that suction of sufficient magnitude for efficient operation is always available to the pump regardless of the operating condition of the vehicle. Concurrently, that source in which the higher pressure is existent is automatically sealed off by the valve from the low pressure source so as to prevent the latter from sucking fluid from the former and so interfering with its operation.

Having thus disclosed an exemplary embodiment thereof, what I claim as my invention is:

1. A windshield clearing system for an automotive vehicle having a windshield and an engine with a primary source of suction comprising, a pneumatically powered washer pump connected to said primary source of suction, means including said pump for delivering fluid under pressure to the windshield of the vehicle, a valve mechanism interposed between said primary source of suction and said pump, an engine driven auxiliary source of suction connected to said valve mechanism, the magnitude of the suction created by said auxiliary source varying inversely with the magnitude of the suction created by said primary source, and means within said valve mechanism for selectively intercommunicating said pump and that one of said sources which is creating suction of the greatest magnitude while automatically closing off the other of said sources from the suction influence of said one source.

2. A windshield clearing system for an automotive vehicle having a windshield and an engine with a primary source of suction comprising, a valve mechanism having an inlet passageway and first and second outlet passageways, a pressure responsive element having open and closed positions interposed between said inlet passageway and each of said outlet passageways, a pneumatically powered washer pump connected to said inlet passageway, means including said pump for delivering fluid under pressure to the windshield of the vehicle, means interconnecting said primary source of suction and said first outlet passageway, and an auxiliary source of suction comprising an engine driven pump connected to said second outlet passageway, each of said pressure responsive elements automatically moving to closed position when the pressure in said inlet passageway is less than the pressure in the outlet passageway to which said element is exposed.

3. A windshield clearing system for an automotive vehicle having a windshield and an engine with a primary source of suction comprising, a valve mechanism having first and second pressure chambers, an inlet passageway connected to both of said chambers, a pressure responsive element having open and closed positions interposed between each of said pressure chambers and said inlet passageway, said elements sealing off their respective chambers from said inlet passageway when in closed position, a pneumatically powered washer pump connected to said inlet passageway, means including said pump for delivering fluid under pressure to the windshield of the vehicle, means interconnecting said primary source of suction and said first pressure chamber, and an engine driven auxiliary source of suction connected to said second pressure chamber, each of said pressure responsive elements individually moving to closed position when the pressure in its associated pressure chamber is greater than the pressure in said inlet passageway and opening when the pressure in its chamber is less than that in said passageway.

4. A windshield clearing system for an automotive vehicle having a windshield and an engine with a primary source of suction comprising, a valve mechanism having first and second pressure chambers, an inlet passageway connected to both of said chambers, normally closed pressure responsive elements interposed between said pressure chambers and said inlet passageway, a pneumatically powered washer pump connected to said inlet passageway, means including said pump for delivering fluid under pressure to the windshield of the vehicle, means interconnecting said primary source of suction and said first pressure chamber, and an engine driven auxiliary source of suction connected to said second pressure chamber, the magnitude of suction created by said sources fluctuating in inverse relation during normal operation of the vehicle, said pressure responsive elements moving to open position when the pressure existent in the pressure chamber associated therewith is of a lesser magnitude than that existent in the other pressure chamber.

5. A windshield clearing system for an automotive vehicle having a windshield and an engine with a primary source of suction comprising, a valve mechanism having first and second pressure chambers, an inlet passageway connected to both of said chambers, a pressure responsive element having open and closed positions interposed between said first pressure chamber and said inlet passageway, a pneumatically powered washer pump connected to said inlet passageway, means including said pump for delivering fluid under pressure to the windshield of the vehicle, means interconnecting said primary source of suction and said first pressure chamber, and an auxiliary source of suction comprising an engine driven pump connected to said second pressure chamber, said pressure responsive element moving to closed position when the pressure existent in said second pressure chamber is of a lesser magnitude than that existent in said first pressure chamber.

References Cited in the file of this patent

UNITED STATES PATENTS

| | | |
|---|---|---|
| 1,403,290 | Catching | Jan. 10, 1922 |
| 2,142,256 | Horton | Dec. 27, 1938 |
| 2,427,347 | Bessy | Sept. 16, 1947 |
| 2,597,059 | Bitzer | May 20, 1952 |